(12) United States Patent
Ngo

(10) Patent No.: US 11,627,835 B2
(45) Date of Patent: Apr. 18, 2023

(54) OUTDOOR TRAVEL STOVE

(71) Applicant: FIRE GROUP IP, LLC, Centreville, VA (US)

(72) Inventor: Howard Ngo, Centreville, VA (US)

(*) Notice: Subject to any disclaimer, the term of this patent is extended or adjusted under 35 U.S.C. 154(b) by 280 days.

(21) Appl. No.: 17/102,932

(22) Filed: Nov. 24, 2020

(65) Prior Publication Data

US 2021/0177203 A1 Jun. 17, 2021

Related U.S. Application Data

(60) Provisional application No. 62/946,566, filed on Dec. 11, 2019.

(51) Int. Cl.
*A47J 37/07* (2006.01)

(52) U.S. Cl.
CPC .... *A47J 37/0763* (2013.01); *A47J 2037/0777* (2013.01)

(58) Field of Classification Search
CPC ................ A47J 37/0763; A47J 37/0623; A47J 2037/0777
See application file for complete search history.

(56) References Cited

U.S. PATENT DOCUMENTS

| 3,915,144 | A | * | 10/1975 | Tomita | F24B 3/00 126/25 B |
| 4,911,140 | A | * | 3/1990 | Robinson | F24B 1/205 126/9 R |
| 5,203,316 | A | * | 4/1993 | Pritchett | E04H 15/26 126/30 |
| 2017/0172158 | A1 | * | 6/2017 | Lipinski | A47J 37/0713 |
| 2018/0103799 | A1 | * | 4/2018 | Minnich | F24B 3/00 |

* cited by examiner

*Primary Examiner* — Alfred Basichas

(57) ABSTRACT

The present application discloses an outdoor travel stove. The outdoor travel stove comprises a base having a first closable air hole, a side wall coupled to the base, wherein the side wall comprises a second closable air hole and an opening, and a top cover removably coupled to the side wall. When the base, the side wall and the top cover are assembled together and the first closable air hole, the second closable air hole and the opening are closed, the outdoor travel stove forms an airtight space.

13 Claims, 6 Drawing Sheets

OUTDOOR TRAVEL STOVE

This application claims the benefit of provisional application No. 62/946,566, filed on Dec. 11, 2019, and the entireties of which are incorporated by references herein.

BACKGROUND OF THE INVENTION

Field of the Invention

The present invention relates to a stove, and particularly relates to an outdoor travel stove which is collapsible, lightweight and easy to assemble and disassemble.

Description of the Related Art

Many outdoor enthusiasts travel to both camp areas and remote areas that do not allow open fires. This restriction limits the experience of the outdoors, especially in cold areas and remote areas that do not allow users to disturb the wildlife and the nature. This restriction also forces the user to carry in heavy items such as propane, butane, white gas, kerosene, unleaded auto fuel, diesel or jet fuel.

The traditional methods of fire rings are available in campsites, but the users are confined to the fire rings. Not all camp areas allow open fires or have fire rings available. The open fire is also limited to the area of the fire rings, which might be very inconvenient depending on the topography of the camping area.

Other than using the fire rings in campsites, there are a few stoves that might be used on tabletops. However, none of the conventional tabletop stoves could control the fire level with vents or contains lids to extinguish the fire. Overall, a safe, lightweight, foldable, and collapsible outdoor travel stove is desired to make it easy to travel with and promote easy clean up, leaving nature untouched.

The disclosed devices and mechanisms are directed to solve one or more problem in this area. It should be noted that, unless explicitly acknowledged, the above background information is part of the present disclosure and is not intended to be prior art.

SUMMARY OF THE INVENTION

The purpose of the present application is to improve the outdoor experience and safety measures of having an open fire. With the outdoor travel stove (OTS), this application solves the issue of having an open fire in a fire ring. The outdoor travel stove disclosed in the present application is collapsible, lightweight, and easy to assemble and disassemble. The user might contain the fire within the disclosed stove as well as have the fire on an outdoor tabletop. The user might also use natural wood lying around the area to conduct the fire, which is more natural and better for the environment than bringing in other sources of fuel.

One aspect of the present disclosure provides an outdoor travel stove. The outdoor travel stove includes a base having a first closable air hole, a side wall having a second closable air hole and an opening, and a removable top cover. When the base, the side wall and the top cover are assembled together and the first closable air hole, the second closable air hole and the opening are closed, the outdoor travel stove forms an airtight space. The present disclosure provides an outdoor travel stove with improved mechanisms to limit air flow and oxygen levels, which could turn off or extinguish the fire for better safety measures.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE INVENTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 1:
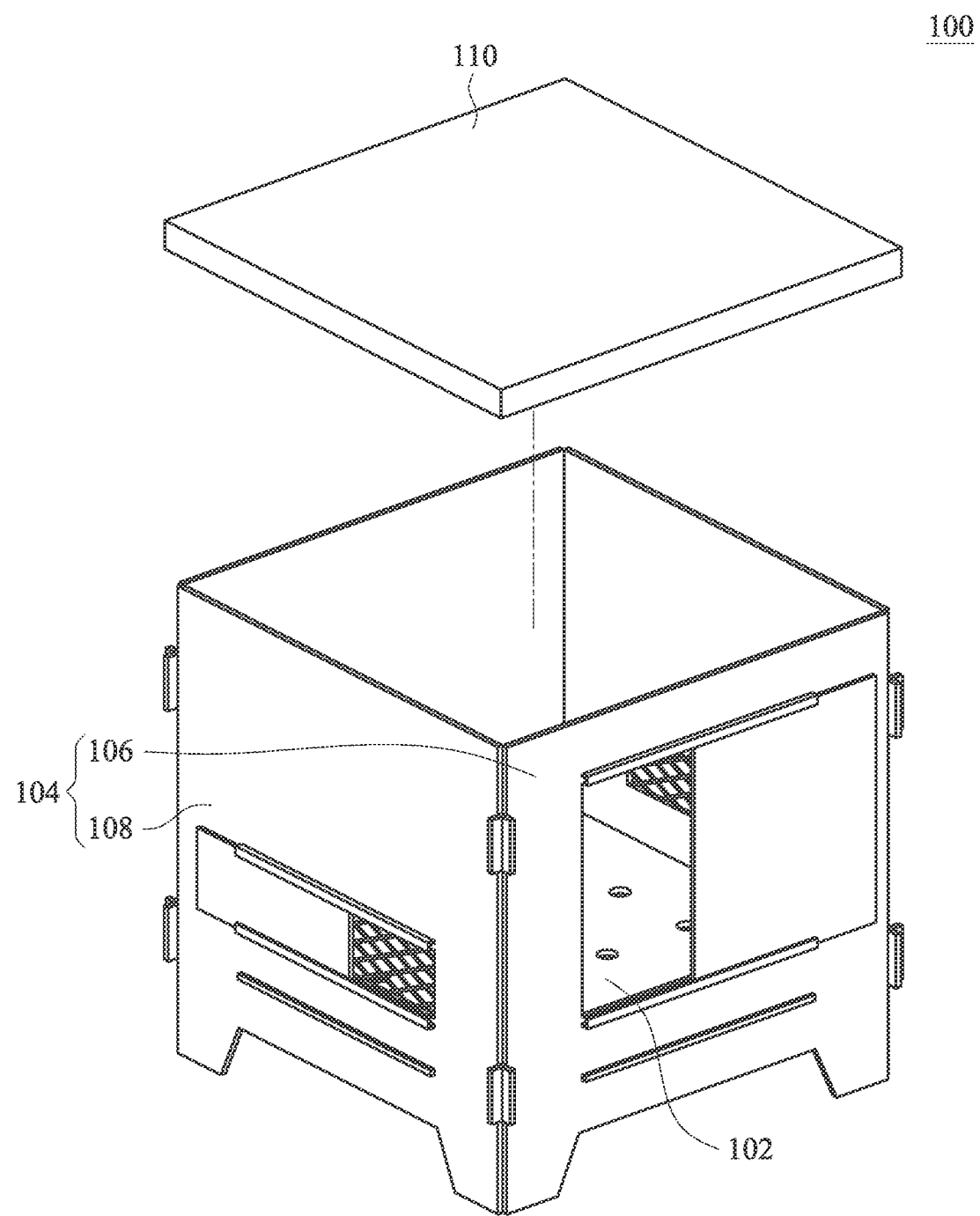
FIG. 1 illustrates an exemplary outdoor travel stove consistent with various disclosed embodiments.

FIG. 1 illustrates an exemplary outdoor travel stove consistent with various disclosed embodiments. Referring to FIG. 1, in some embodiments, the outdoor travel stove 100 includes a base 102, a side wall 104 and a top cover 110. The side wall 104 further includes at least one first wall component 106 and at least one second wall component 108. The first wall component 106 and the second wall component 108 are coupled to the base 102 by mortise joint, and the first wall component 106 and the second wall component 108 are also coupled each other by mortise joint, as shown in FIG. 1. However, the mortise joint is merely described here as an example of the coupling mechanism, and those skilled in the art could use other alternative ways to couple or connect those components. For example, in some embodiments, the first wall component 106 and the second wall component 108 might be coupled together by joggle joint, mortise joint, hinge, screw, bolt, plug or latch mechanism. The base 102 and the side wall 104 might be coupled together by joggle joint, mortise joint, hinge, screw, bolt, plug or latch mechanism as well.

Figure 2:
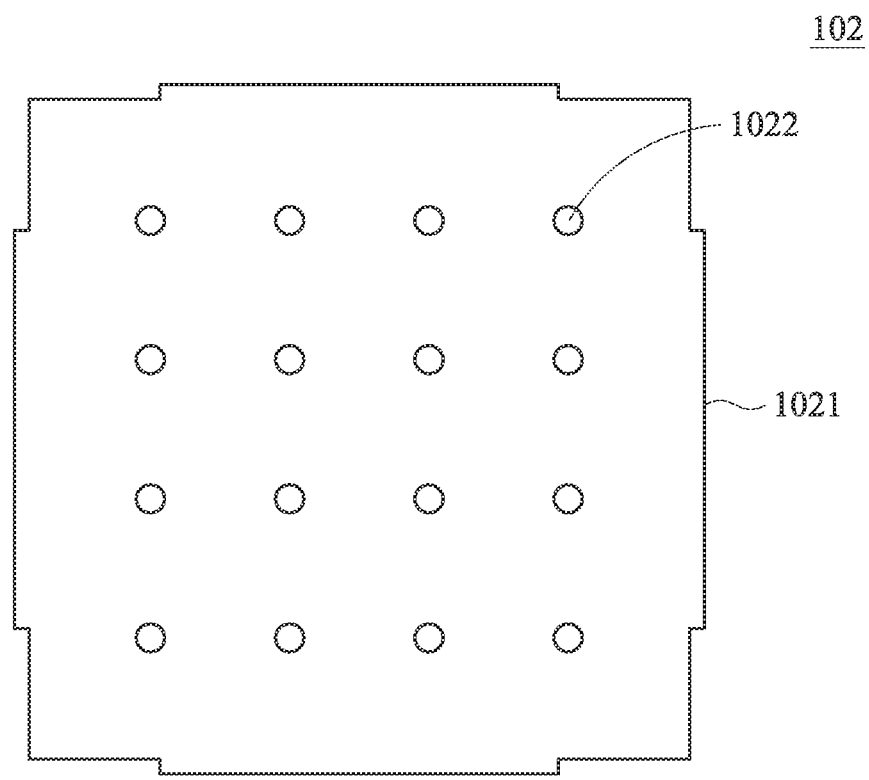
FIG. 2 illustrates a base of an exemplary outdoor travel stove consistent with various disclosed embodiments.

FIG. 2 illustrates a base of an exemplary outdoor travel stove consistent with various disclosed embodiments. As shown in FIG. 2, the base 102 might be a square or rectangle plate with protuberances 1021 at the edges for connecting the side wall 104. The base 102 also includes several closable air holes 1022 for ventilation when using the outdoor travel stove. The base 102 locates at the bottom of the outdoor travel stove and a ventilation gap is designed between the base 102 and the ground or the tabletop when the outdoor travel stove is assembled, as shown in FIG. 1. In some embodiments, the closable air holes 1022 might include various capable mechanisms to open or close the holes, such as door vent, slide vent, damper, window vent, window swivel, latch vent or twist vent.

Figure 3:
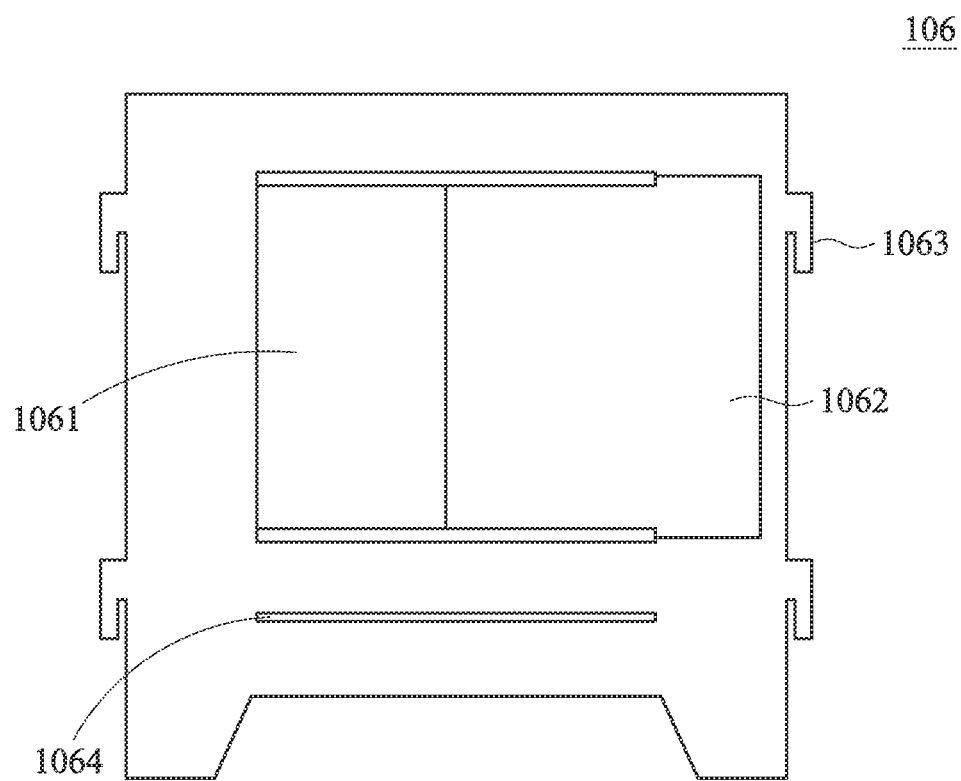
FIG. 3 illustrates a first wall component of an exemplary outdoor travel stove consistent with various disclosed embodiments.

FIG. 3 illustrates a first wall component of an exemplary outdoor travel stove consistent with various disclosed embodiments. As shown in FIG. 3, the first wall component 106 includes an opening 1061. The opening 1061 is used for supplying fuel to the outdoor travel stove 100, and the opening 1061 may be closed by using a closable door 1062. The door 1062 might be a slide door, as shown in FIG. 3, a hinged door or other types of doors. The first wall component 106 further includes several protuberances 1063 for coupling with the second wall component 108 or other compatible wall components. The first wall component 106 also includes a slot 1064 for inserting the protuberance 1021 of the base 102. It should be noted that the structure, amount or coupling mechanisms of the protuberances 1063 or the slot 1064 shown in FIG. 3 are merely for illustration and are not intended to limit the present disclosure. In other embodiments, the protuberances 1063 might be substituted by joggle joint, mortise joint, hinge, screw, bolt, plug or latch mechanism. In other embodiments, the slot 1064 might be substituted by joggle joint, mortise joint, hinge, screw, bolt, plug or latch mechanism as well.

Figure 4:
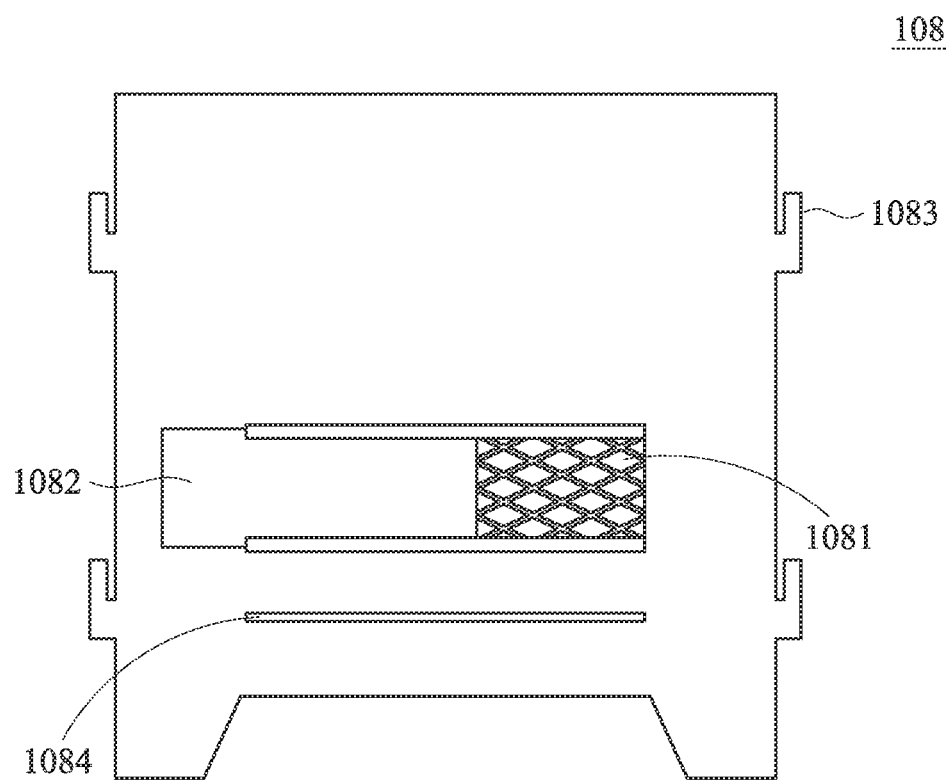
FIG. 4 illustrates a second wall component of an exemplary outdoor travel stove consistent with various disclosed embodiments.

FIG. 4 illustrates a second wall component of an exemplary outdoor travel stove consistent with various disclosed embodiments. The second wall component 108 includes a closable air hole 1081, wherein the closable air hole 1081 might be closed by a slide door 1082. The closable air hole 1081 might be a venting opening, a meshed opening or other types of air holes and might include various capable mechanisms to open or close the holes, such as door vent, slide vent, damper, window vent, window swivel, latch vent or twist vent. The second wall component 108 further includes several protuberances 1083 for coupling with the first wall component 106 or other compatible wall components. The second wall component 108 also includes a slot 1084 for inserting the protuberance 1021 of the base 102. It should be noted that the structure, amount or coupling mechanisms of the protuberances 1083 or the slot 1084 shown in FIG. 4 are merely for illustration and are not intended to limit the present disclosure. In other embodiments, the protuberances 1083 might be substituted by joggle joint, mortise joint, hinge, screw, bolt, plug or latch mechanism. In other embodiments, the slot 1084 might be substituted by joggle joint, mortise joint, hinge, screw, bolt, plug or latch mechanism as well.

When the base 102, the side wall 104 and the top cover 110 are assembled together and the first closable air holes 1022, the second closable air hole 1081, the opening 1061 and the top cover 110 are closed, the outdoor travel stove 100 forms an airtight space. Therefore, the user might contain the fire within the disclosed stove as well as have the fire on an outdoor tabletop, and after using the outdoor travel stove 100, the air could be isolated to extinguish the fire.

Figure 5A:
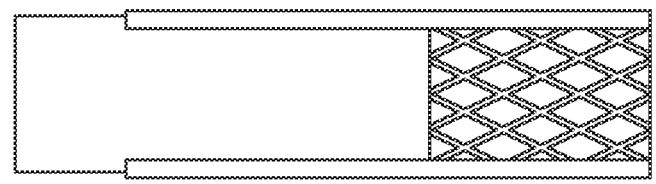
FIG. 5A-5C illustrate various examples of a closable air hole of an exemplary outdoor travel stove consistent with various disclosed embodiments.
Figure 5B:
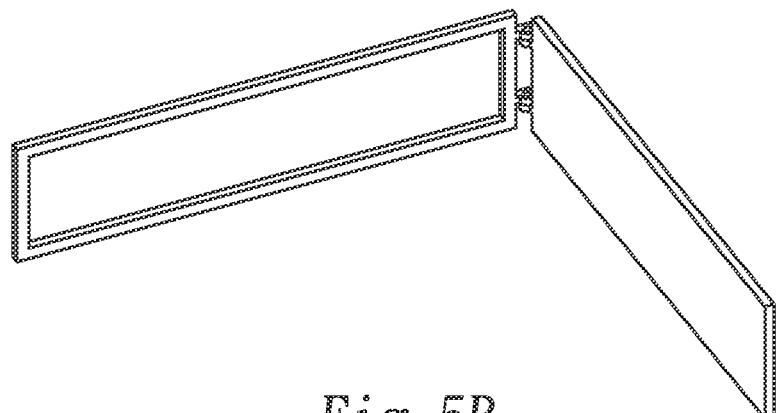
Figure 5C:
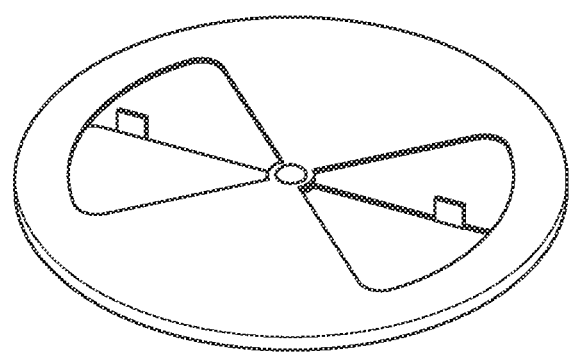

FIG. 5A-5C illustrate various examples of a closable air hole of an exemplary outdoor travel stove consistent with various disclosed embodiments. As shown in FIG. 5A-5C, the closable air hole 1022 and the closable air hole 1081 in the present embodiments might adopt various designs. The closable air hole 1022 and the closable air hole 1081 in the present embodiments might incorporate different ventilation designs such as the door vent, slide vent, window vents, window swivel, latch style, twist vent, etc. For example, as shown in FIG. 5A, the closable air hole might be a meshed opening collocating with a side door. Further, as shown in FIG. 5B, the closable air hole might be a hollow collocating with a hinged door. Further, as shown in FIG. 5C, the closable air hole might be a twist shutter structure. The amount of the openings of the twist shutter structure in FIG. 5C is two, and the amount or the shape of the openings could be further modified based on user's requirements. For example, the twist shutter structure might have four openings, or the pivot of twisting might be located on the edge of the opening. It should be noted here that the openings and the doors illustrated in the embodiments could be substituted in accordance with the user's requirements. For examples, the meshed opening might be collocated with a hinged door, and so on. The closable air holes described in the present invention incorporate different ventilation options that suit the user's need and could be interchanged depending on user preference.

Figure 6:
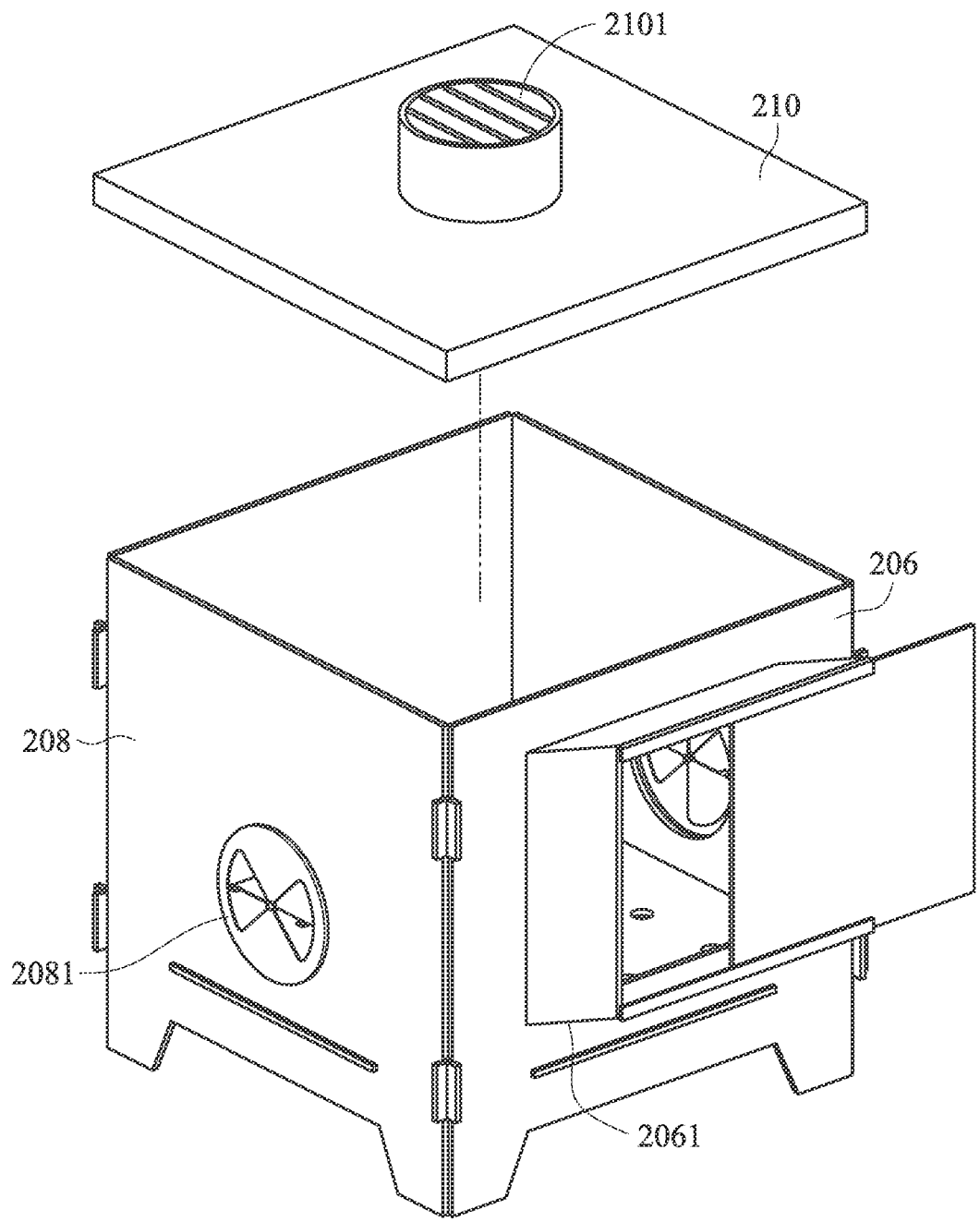
FIG. 6 illustrates another exemplary outdoor travel stove consistent with various disclosed embodiments.

FIG. 6 illustrates another exemplary outdoor travel stove consistent with various disclosed embodiments. In another embodiment, as shown in FIG. 6, each of the base, the wall components 206 and 208 and the top cover 210 could have different designs. In another embodiment, the wall component 206 might have a tilted opening 2061 for easily supplying the fuel to the outdoor travel stove. When incorporating the present outdoor travel stove with the tilted opening 2061 where the fuel or the firewood will be placed, but at an angle, so as the firewood burns, it slides into the stove rather than outside. In another embodiment, the opening 2016 might be a rectangle opening with a slide door or a hinged door. In another embodiment, the opening 2061 might be a cylinder tube with a shutter door. Other kinds of assembling using any structure described in the disclosure should be also considered the scope of the present invention.

Furthermore, as shown in FIG. 6, the top cover 210 might include various attachments having different functions, and the user could attach one or more attachments onto the top cover 210. In one embodiment, a grill 2101 might be attached onto the top cover 210 for using the outdoor travel stove as a grill stove. For other embodiments, the attachments could be a pan holder, a cup holder, a cooking plate, a stove, a grill or a chimney based on the user's desire. In some embodiments, the top cover 210 could be further designed an opening to install the attachments. These attachments could advance the cooking and heating options.

The shape or the amount of the wall components 106, 108, 206 or 208 could be chosen and assembled at will, and therefore, the top view of the side wall 104 might be a circle, an oval, a triangle, a square, a rectangle, a polygon or a starlike shape. The advantage includes the flexibility to incorporate the wall components as well as the top cover to make them interchangeable and replaceable to facilitate an expandable device which is multi-functional. The device will allow for vent control based on the various ventilation designs mentioned previously.

In a further embodiment, the outdoor travel stove might further include a battery-operated fan attached to the side wall. The fan might be installed on one of the wall components to enhance the air circulation when using the outdoor travel stove. In some embodiments, the fan could be also installed on the top cover or the base. The fan would help blow the air into the stove, especially in high altitude areas where oxygen is limited.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. An outdoor travel stove, comprising:
   a base having a first closable air hole;
   a side wall coupled to the base, wherein the side wall comprises a second closable air hole and an opening; and
   a top cover removably coupled to the side wall;
   wherein when the base, the side wall and the top cover are assembled together and the first closable air hole, the second closable air hole and the opening are closed, the outdoor travel stove forms an airtight space; and
   wherein the side wall comprises a first wall component having the opening and a second wall component having the second closable air hole, and the first wall component and the second wall component are located on different planes directly coupled to the base.

2. The outdoor travel stove of claim 1, wherein the side wall is coupled to the base by joggle joint, mortise joint, hinge, screw, bolt, plug or latch mechanism.

3. The outdoor travel stove of claim 1, wherein the first wall component and the second wall component are coupled by joggle joint, mortise joint, hinge, screw, bolt, plug or latch mechanism.

4. The outdoor travel stove of claim 3, wherein at least one of the first wall component and at least one of the second wall component are jointly connected to form the side wall having a top view in circle, oval, triangle, square, rectangle, polygon or starlike.

5. The outdoor travel stove of claim 3, wherein the first wall component having the opening is capable of providing fuel of the outdoor travel stove through the opening.

6. The outdoor travel stove of claim 5, wherein the opening comprises a tilted opening.

7. The outdoor travel stove of claim 1, wherein the first closable air hole comprises door vent, slide vent, damper, window vent, window swivel, latch vent or twist vent.

8. The outdoor travel stove of claim 1, wherein the second closable air hole comprises door vent, slide vent, damper, window vent, window swivel, latch vent or twist vent.

9. The outdoor travel stove of claim 1, wherein the top cover further comprises a top opening, and the top cover is capable of being a pan holder, a cup holder, a cooking plate, a stove, a grill or a chimney.

10. The outdoor travel stove of claim 1, wherein the top cover further comprises an interchangeable component, and the interchangeable component comprises a pan holder, a cup holder, a cooking plate, a stove, a grill or a chimney.

11. The outdoor travel stove of claim 1 further comprising a battery-operated fan attached to the side wall.

12. The outdoor travel stove of claim 1, wherein the base is substantially perpendicular to the side wall.

13. The outdoor travel stove of claim 12, wherein the first wall component is substantially perpendicular to the second wall component.

* * * * *